(12) United States Patent
Elliot et al.

(10) Patent No.: US 9,888,039 B2
(45) Date of Patent: Feb. 6, 2018

(54) NETWORK-BASED PERMISSIONING SYSTEM

(71) Applicant: Palantir Technologies Inc., Palo Alto, CA (US)

(72) Inventors: Mark Elliot, New York City, NY (US); Jason Zhao, Menlo Park, CA (US); Brian Schimpf, Vienna, VA (US); Jacob Meacham, Sunnyvale, CA (US); Marco Gelmi, London (GB); Benjamin Duffield, New York, NY (US); Savino Sguera, London (GB); James Baker, Cambridge (GB); Neil Rickards, London (GB); Javier Campanini, New York City, NY (US); Qinfeng Chen, Queens Village, NY (US); Derek Cicerone, New York City, NY (US); Nathan Ziebart, East Palo Alto, CA (US)

(73) Assignee: Palantir Technologies Inc., Palo Alto, CA (US)

(*) Notice: Subject to any disclaimer, the term of this patent is extended or adjusted under 35 U.S.C. 154(b) by 0 days.

(21) Appl. No.: 15/204,866

(22) Filed: Jul. 7, 2016

(65) Prior Publication Data

US 2017/0359379 A1 Dec. 14, 2017

Related U.S. Application Data

(60) Provisional application No. 62/272,003, filed on Dec. 28, 2015.

(51) Int. Cl.
*H04L 29/06* (2006.01)
*G06F 21/00* (2013.01)

(52) U.S. Cl.
CPC .............. *H04L 63/20* (2013.01); *H04L 63/08* (2013.01); *H04L 63/10* (2013.01); *H04L 2463/121* (2013.01)

(58) Field of Classification Search
CPC ......... H04L 63/20; H04L 63/10; H04L 63/08; H04L 2463/121
See application file for complete search history.

(56) References Cited

U.S. PATENT DOCUMENTS

| | | | |
|---|---|---|---|
| 5,978,475 | A | 11/1999 | Schneier et al. |
| 6,725,240 | B1 | 4/2004 | Asad et al. |

(Continued)

FOREIGN PATENT DOCUMENTS

| | | |
|---|---|---|
| CN | 101729531 | 6/2010 |
| CN | 103281301 | 9/2013 |

(Continued)

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

(Continued)

*Primary Examiner* — Lisa Lewis
(74) *Attorney, Agent, or Firm* — Schwegman Lundberg & Woessner, P.A.

(57) ABSTRACT

Aspects of the present disclosure include a system comprising a computer-readable storage medium storing at least one program and a method for managing access permissions associated with data resources. Example embodiments involve evaluating user access permissions with respect to shared data resources of a group of network applications. The method includes receiving a request, from one of the network applications, to access a particular data resource.

(Continued)

The request includes an identifier of a requesting user. The method further includes accessing a policy object associated with the data resource that includes policy information specifying operations the user is authorized to perform with respect to the data resource based on satisfaction of one or more conditions. The method further includes evaluating the user's access permissions with respect to the data resource based on the policy object, and communicating a response to the network application that includes the access permission of the user.

20 Claims, 9 Drawing Sheets

(56) References Cited

U.S. PATENT DOCUMENTS

| | | | |
|---|---|---|---|
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,526,435 B1* | 4/2009 | Abe | G06Q 30/0264 705/14.61 |
| 7,596,285 B2 | 9/2009 | Brown et al. | |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,141,129 B2* | 3/2012 | Ray | G06F 21/604 705/59 |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Grysznov | |
| 8,312,546 B2 | 11/2012 | Alme | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,335,897 B2 | 5/2016 | Goldenberg | |
| 9,338,013 B2 | 5/2016 | Castellucci et al. | |
| 9,400,891 B2* | 7/2016 | Stephens | G06F 21/6209 |
| 2001/0007133 A1 | 7/2001 | Moriconi et al. | |
| 2002/0112157 A1 | 8/2002 | Doyle et al. | |
| 2003/0018786 A1* | 1/2003 | Lortz | H04L 41/0893 709/226 |
| 2003/0188198 A1* | 10/2003 | Holdsworth | G06F 21/6218 726/1 |
| 2004/0010607 A1* | 1/2004 | Lee | G06Q 40/08 709/229 |
| 2004/0123139 A1 | 6/2004 | Aiello et al. | |
| 2004/0153418 A1 | 8/2004 | Hanweck | |
| 2004/0250124 A1 | 12/2004 | Chesla et al. | |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0212931 A1 | 9/2006 | Shull et al. | |
| 2006/0218637 A1 | 9/2006 | Thomas et al. | |
| 2006/0232826 A1* | 10/2006 | Bar-El | G06F 21/6218 358/403 |
| 2006/0265747 A1 | 11/2006 | Judge | |
| 2007/0143851 A1 | 6/2007 | Nicodemus | |
| 2007/0271219 A1* | 11/2007 | Agarwal | G06F 11/008 |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0106442 A1* | 4/2009 | Liu | H04L 29/06027 709/231 |
| 2009/0119392 A1* | 5/2009 | Bonjour | H04L 41/16 709/223 |
| 2009/0228701 A1 | 9/2009 | Lin | |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0235915 A1 | 9/2010 | Memon et al. | |
| 2010/0262688 A1 | 10/2010 | Hussain et al. | |
| 2010/0330801 A1 | 12/2010 | Rouh | |
| 2011/0023085 A1* | 1/2011 | Inoue | H04L 63/102 726/1 |
| 2011/0029781 A1* | 2/2011 | Clark | G06F 21/31 713/182 |
| 2011/0060910 A1 | 3/2011 | Gormish et al. | |
| 2011/0110633 A1 | 5/2011 | Erlendsson | |
| 2011/0113471 A1* | 5/2011 | Hjelm | H04L 12/66 726/1 |
| 2011/0202555 A1 | 8/2011 | Cordover et al. | |
| 2011/0219450 A1 | 9/2011 | McDougal et al. | |
| 2012/0079592 A1 | 3/2012 | Pandrangi | |
| 2012/0084866 A1 | 4/2012 | Stolfo | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0233689 A1 | 9/2012 | Korablev et al. | |
| 2012/0254129 A1 | 10/2012 | Wheeler et al. | |
| 2012/0284791 A1 | 11/2012 | Miller et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0139268 A1 | 5/2013 | An et al. | |
| 2013/0239217 A1 | 9/2013 | Kindler et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0229844 A1* | 8/2014 | De Armas | G06F 3/048 715/739 |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castellucci et al. | |
| 2015/0189036 A1* | 7/2015 | He | H04L 67/06 709/203 |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0281248 A1 | 10/2015 | Obbard | |
| 2015/0326601 A1 | 11/2015 | Grondin et al. | |
| 2016/0004864 A1 | 1/2016 | Falk et al. | |
| 2016/0028759 A1 | 1/2016 | Visbal | |
| 2016/0072842 A1* | 3/2016 | Greenbaum | H04L 63/0254 726/1 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Bhuyan et al., "Network Anomaly Detection: Methods, Systems and Tools," First Quarter 2014, IEEE.

(56) References Cited

OTHER PUBLICATIONS

Crosby et al., "Efficient Data Structures for Tamper-Evident Logging," Department of Computer Science, Rice University, 2009, pp. 17.
FireEye—Products and Solutions Overview, <http://www.fireeye.com/products-and-solutions> Printed Jun. 30, 2014 in 3 pages.
FireEye, <http://www.fireeye.com/> Printed Jun. 30, 2014 in 2 pages.
Glaab et al., "EnrichNet: Network-Based Gene Set Enrichment Analysis," Bioinformatics 28.18 (2012): pp. i451-i457.
Hur et al., "SciMiner: web-based literature mining tool for target identification and functional enrichment analysis," Bioinformatics 25.6 (2009): pp. 838-840.
Lee et al., "A Data Mining and CIDF Based Approach for Detecting Novel and Distributed Intrusions," Lecture Notes in Computer Science, vol. 1907 Nov. 11, 2000, pp. 49-65.
Ma et al., "A New Approach to Secure Logging," ACM Transactions on Storage, vol. 5, No. 1, Article 2, Published Mar. 2009, 21 pages.
Schneier et al., "Automatic Event Stream Notarization Using Digital Signatures," Security Protocols, International Workshop Apr. 1996 Proceedings, Springer-Veriag, 1997, pp. 155-169, https://schneiers.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
VirusTotal—About, <http://www.virustotal.com/en/about/> Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "GOEAST: a web-based software toolkit for Gene Ontology enrichment analysis" Nucleic acids research 36.suppl 2 (2008): pp. W385-W363.
Notice of Allowance for U.S. Appl. No. 14/033,076 dated Mar. 11, 2016.
Notice of Allowance for U.S. Appl. No. 14/223,918 dated Jan. 6, 2016.
Notice of Allowance for U.S. Appl. No. 14/473,860 dated Jan. 5, 2015.
Notice of Allowance for U.S. Appl. No. 14/823,935 dated Apr. 25, 2016.
Notice of Allowance for U.S. Appl. No. 14/970,317 dated May 26, 2016.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for European Patent Application No. 15180985.2 dated Jan. 15, 2016.
Official Communication for U.S. Appl. No. 14/816,748 dated May 24, 2016.
Official Communication for U.S. Appl. No. 14/223,918 dated Jun. 8, 2015.
Official Communication for U.S. Appl. No. 14/280,490 dated Jul. 24, 2014.
Official Communication for U.S. Appl. No. 14/479,863 dated Dec. 26, 2014.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/731,312 dated Apr. 14, 2016.
Official Communication for U.S. Appl. No. 14/816,748 dated Apr. 1, 2016.
Official Communication for U.S. Appl. No. 14/823,935 dated Dec. 4, 2015.
Official Communication for U.S. Appl. No. 14/923,712 dated Feb. 12, 2016.
Official Communication for U.S. Appl. No. 14/970,317 dated Mar. 21, 2016.
Official Communication for U.S. Appl. No. 14/982,699 dated Mar. 25, 2016.
"European Application Serial No. 16207027.0, Extended European Search Report dated Mar. 28, 2017", 7 pgs.

\* cited by examiner

NETWORK-BASED PERMISSIONING SYSTEM

CROSS-REFERENCE TO RELATED APPLICATION

This application claims priority of U.S. Provisional Patent Application Ser. No. 62/272,003, filed Dec. 28, 2015, which is incorporated by reference herein in its entirety.

TECHNICAL FIELD

The subject matter disclosed herein relates to access permissions of data resources. In particular, example embodiments relate to systems and methods for registering and evaluating policies associated with data resources in a computer network environment.

BACKGROUND

Typical computer systems include a file system to control how data is stored and retrieved. Conventional file systems maintain information regarding user access permission in conjunction with each stored resource to control users' ability to access the resources. For example, one user may be permitted to view and change a particular resource while another user may only be permitted to view the resource. In some instances, multiple application programs may share common access to resources included in a single file system. For example, a suite of network applications may provide a common interface that provides a user with various related functionalities that allow the user to interact with a common repository of data objects shared by the application suite. In these instances, each application program is typically responsible for evaluating whether a user has permission to access a resource included in the file system based on the user access permission information maintained along with the resource. Not only does this conventional implementation lead to painstaking redundancies in development of such an application, but this also presents the potential for inconsistent handling of user access permissions across each of the applications.

An additional downfall of conventional file systems is in the handling of resources with dependencies to other resources. Because the permission information of each resource is maintained along with the resource itself, in order to determine whether a user may access a resource with dependencies, the evaluator must traverse the entire tree of dependencies of the resource to reach the correct determination. As a result of this read-heavy workflow, computational resources are inefficiently used because of the number of statements that must be executed to determine the actual access permission of the user, which, in turn, leads to a degradation to system performance.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

DETAILED DESCRIPTION

Figure 1:
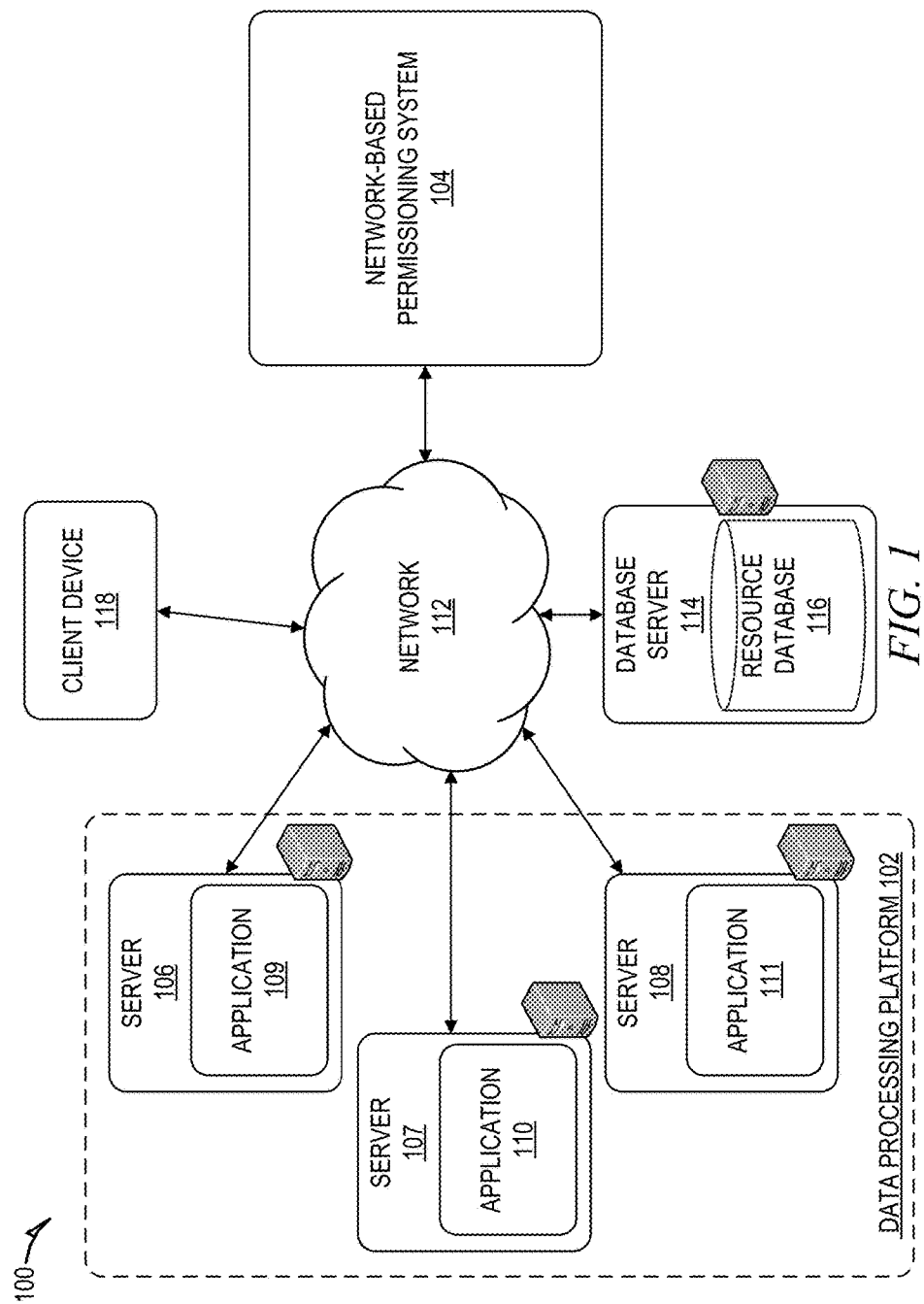
FIG. 1 is a network diagram depicting a network system comprising a group of application servers in communication with a network-based permissioning system configured for registering and evaluating access rights for data resources commonly accessed by the group of application servers, according to an example embodiment.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a network-based permissioning system and methods employed thereby for managing access permissions associated with data resources. A "data resource" as used herein may include any item of data or code (e.g., a data object) that can be used by one or more computer programs. In example embodiments, data resources are stored in one or more network databases and are capable of being accessed by applications hosted by servers that share common access to the network database.

Aspects of the present disclosure involve registering policies associated with data resources. Policies define access permissions of a user or group of users with respect to a data resource. As part of the process for registering policies, the permissioning system provides an interface to users (e.g., by communicating a set of computer readable instructions to a device of the user) that allows the users to specify the access permissions associated with a data resource. Accordingly, the interface includes a field for identifying the data resource (e.g., using a globally unique resource identifier), fields for identifying users (e.g., using a user identifier), and fields for specifying each identified user's access permission with respect to the identified resource.

Once the policy is entered and submitted to the permissioning system by the user, the permissioning system registers the policy with respect to the data resource. In registering each policy, the permissioning system creates or updates a policy object associated with the data resource in a policy database in which other policy objects associated with other data resources are maintained. Further, the permissioning system maintains a representation of a data resource's permissioning hierarchy that is updated to reflect new or updated policies. In this manner, the permissioning system maintains an effective policy for each data resource because the data object representing the policy includes policy information for the entire hierarchical tree, and as such, the object contains all information that is needed to determine a user's access permission with respect to a particular data resource.

Additional aspects of the present disclosure involve evaluating user access permissions with respect to shared data resources. The permissioning system evaluates user's permissions in response to access requests that may be received from any one of multiple applications hosted by servers communicatively linked (e.g., via a network) to the permissioning system. Each access request identifies a data resource and a user requesting access to the data resource. The permissioning system evaluates the identified user's access permission by accessing policy information included in a policy object associated with the data resource and stored in the policy database. The policy information stored in the policy object includes policies explicitly associated with the data resource as well as policies implicitly associated with the data resource by virtue of the data resource's dependency to other data resources. The permissioning system communicates a response to the application, from which the access request was received, that includes the access permission of the user. The access permission includes one or more operations that the user is authorized to perform with respect to the data resources. In some instances, the access permissions may include operations that are specific to the application from which the access request was received.

FIG. 1 is a network diagram depicting a network system 100 comprising a data processing platform 102 in communication with a network-based permissioning system 104 configured for registering and evaluating access permissions for data resources to which the group of application servers 106-108 share common access, according to an example embodiment. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyze data to develop various insights about the data, and visualize various metrics associated with the data. To further this example, the network application 109 may be used to analyze data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

Each of the servers 106-108 are in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

To access data resources from the resource database 116, the servers 106-108 transmit access requests via the network 112 to the network-based permissioning system 104. An access request includes a data resource identifier and a user identifier corresponding to a user (also referred to herein as a "requesting user") who is utilizing one of the applications 109-111 to access to the data resource (also referred to herein as a "requesting application"). The network-based permissioning system 104 may include an application programming interface (API) or other machine interface to receive such access requests from the server 106-108 hosting the requesting application 109-111.

Upon receiving an access request for a particular data resource, the network-based permissioning system 104 accesses a separately stored policy object associated with the particular data resource. Policy objects are stored in a database of the network-based permissioning system 104, which is maintained independently of the resource database 116.

A policy object is a data structure that includes an identifier (e.g., a globally unique resource identifier) of the data resource to which it is associated, an identifiers of a parent data resource from which the data resource depends (referred to as a "parent identifier"), and policy information that includes dependent resource identifiers. The policy information also includes one or more statements that specify operations the user is or is not authorized to perform with respect to the data resource based on satisfaction of one or more conditions. Authorized operations may be globally applicable to the network system 100, or may be specific to any one of the network applications 109-111.

The network-based permissioning system 104 uses the policy information in the corresponding policy object to determine the user's access permissions with respect to the data resource. Once the network-based permissioning system 104 determines the user's access permission with respect to the data resource, the network-based permissioning system 104 communicates a response to the access request to the requesting application. More specifically, the network-based permissioning system 104 communicates one or more data packets (e.g., computer-readable information) to the server hosting the requesting application as a response to the access request. The response to the access request includes the identified requesting user's access permissions with respect to the data resource. The requesting user's access permissions may include one or more authorized operations the user may perform on the data resource.

Accordingly, the network-based permissioning system 104 serves as a centralized permissioning system for the data processing platform 102 to evaluate access permissions of users of the network system 100 with respect to data resource stored in the resource database 116. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

As shown, the network system 100 also includes a client device 118 in communication with the data processing platform 102 and the network-based permissioning system 104 over the network 106. The client device 118 communicates and exchanges data with the data processing platform 102

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
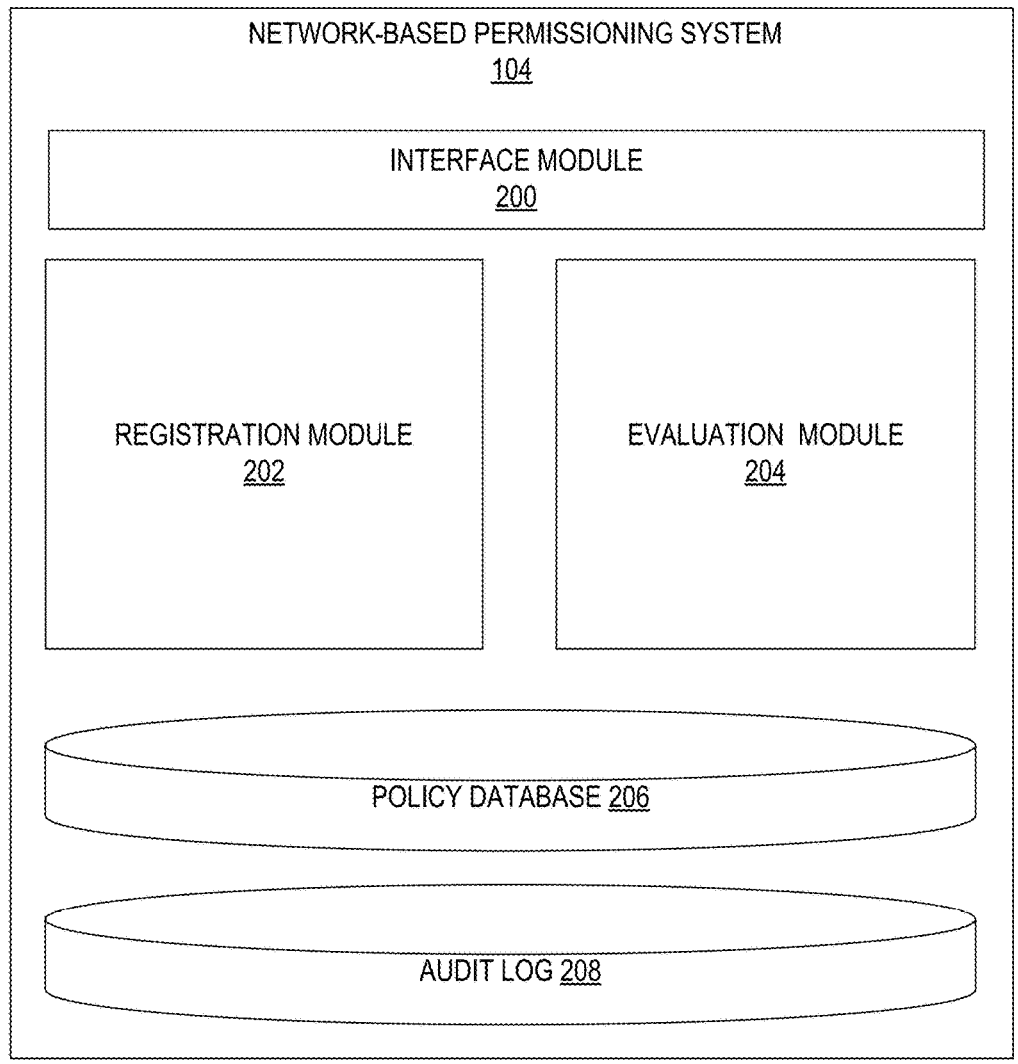
FIG. 2 is a block diagram illustrating various components of the network-based permissioning system, which is provided as part of the network system, consistent with some embodiments.

FIG. 2 is a block diagram illustrating various components of the network-based permissioning system 104, which is provided as part of the network system 100, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the network-based permissioning system 104 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, it shall be appreciated that while the functional components (e.g., modules) of FIG. 2 are discussed in the singular sense, in other embodiments, multiple instances of one or more of the modules may be employed.

The network-based permissioning system 104 is shown as including an interface module 200, a registration module 202, and an evaluation module 204, all configured to communicate with each other (e.g., via a bus, shared memory, a switch, or application programming interfaces (APIs)). The aforementioned modules of the network-based permissioning system 104 may, furthermore, access a policy database 206 and an audit log 208. The policy database 206 and the audit log 208 each reside on a machine-readable storage medium of the network-based permissioning system 104. The policy database 206 and audit log 208 may be maintained independent of one another.

The interface module 200 receives requests from various devices (e.g., servers 106-108) and communicates appropriate responses to the requesting devices. The interface module 200 provides interfaces to allow devices to request access to data resources stored in the resource database 116. For example, the interface module 200 may receive access requests for data resources in the form of application programming interface (API) request.

The interface module 200 also provides user interfaces to users of the network system 100 (e.g., by communicating a set of computer-readable instructions to computer devices of the users). The interface module 200 also receives user input received through such user interfaces, and passes the received user input on to the applicable component of the network-based permissioning system 104. As an example, the interface module 200 provides user interfaces to allow users to register and modify policies associated with data resources stored in the resource database 116. An example of such user interfaces provided by the interface module 200 is discussed below in reference to FIG. 4.

Policies form the basis of the network-based permissioning system 104's security model. Each policy is composed of a set of unordered statements, and each statement evaluates to a Boolean value of either "TRUE" or "FALSE" and includes: an operation or set of operations that is affected by the statement, an action to take with the specified operation, and a condition used to determine application of the specified application to specified operations.

For each data resource stored in the data resource database 116, the network-based permissioning system 104 maintains a data structure in the policy database 206 that includes a simple resource graph designed to emulate basic file system-like structures and also accommodate dependencies on related resources. Each node in the resource graph represents a data resource. In this way, the network-based permissioning system 104 maintains a representation of a data resource's permission hierarchy in a simple unified object that can be evaluated in isolation. Accordingly, the policy object provides an "effective policy" for each data resource in that each policy object contains the policy information for the entire hierarchical access permission tree in an ordered format such that the evaluation module 204 only needs the effective policy to determine a user's permissions.

The registration module 202 is responsible for registering policies associated with data resources stored in the resource database 116. As part of the registration process, the registration module 202 receives and processes policy registration data submitted by users through user interfaces provided by the interface module 200 (e.g. by providing a set of computer-readable instructions to computer devices of the users) that allow the users to register and modify policies associated with data resources.

During the registration process, a user may interact with various interface elements (e.g., through one or more input devices) of user interfaces to specify policy registration data including: a resource identifier corresponding to a data resource, and a policy associated with the data resource. Each policy may include a user identifier or set of user identifiers corresponding to a user or group of users, though it shall be appreciated that in some instances, a policy may be user agnostic (e.g., allow access before Dec. 25, 2015). Each policy specifies operations users are authorized to perform with respect to the data resource. Upon determining that the user is authorized to create a new policy or modify an existing policy, the registration module 202 registers the policy specified by the user.

In registering a policy, the registration module 202 stores a policy object in the policy database 206. Each policy object is a data structure that is linked to a data resource, although the policy objects and data resources are separately maintained—policy objects are stored in the policy database 206 and data resources are stored in the resource database 116. Each policy object includes: a resource identifier corresponding to the data resource to which the policy is associated; one or more parent identifiers, each of which identify a parent data resource from which the data resource is dependent, if applicable; and a policy associated with the data resource.

Each policy includes one or more statements that specify particular operations that a user is authorized to perform with respect to a particular data resource. In particular, each statement includes a field for each operation (or set of operations), an action, and a condition. The operation field corresponds to an operation that a user is authorized to perform with respect to the data resource. Each operation may be globally applicable to the network-based permissioning system 104 or may be specifically related to one of the network applications 109-111.

Each statement executes according to satisfaction of the particular conditions included therein. As an example, the condition may specify a particular user identifier corresponding to an allowed user, and the condition is satisfied if the user identifier of the requesting user matches the user identifier of the allowed user. As another example, the condition may be a temporal condition such as a time range in which a requesting user may access the data resource, and in this way, the conditions may be used to provide an expiration date (or time) for a policy. Additional example conditions supported by the network-based permissioning system 104 include: a DEPENDENT condition to check if the resulting operations from dependencies contain all or any of the condition specified operations; a GROUP condition to check if a user possesses all or any of the condition specified groups; a NOT condition to negate the result of another condition; an OR condition that takes two or more conditions and checks if any of them evaluate to true; an AND condition that takes two or more conditions and checks if all of them evaluate to true; a USER condition to check if the requesting user is the allowed user; and a USER TYPE condition that checks if the user is of the allowed type (e.g., user or service). It shall be understood the conditions supported by the network-based permissioning system 104 may be extensible and are thus not limited to the above referenced examples. Additionally, conditions may be combined together into arbitrary Boolean expressions. The following is an example of such a combination: "NOT (USER=X)"; "AND(USER=X, GROUP=Y)".

Actions included in the action field define a behavior associated with a particular statement such as allowing or denying a user's ability to perform an operation. Further, the actions may include special overrides to other actions in a data resource's policy inheritance chain. As an example, the actions may include the following: an ALLOW action that grants a specified operation to a current context if the condition evaluates to "TRUE"; a DENY action that denies a specified operation if the condition evaluates to "TRUE" a FORCE-ALLOW action that grants specified operations as a special override and causes the system to ignore all DENY and FORCE-DENY actions, if the condition evaluates to "TRUE"; a FORCE-DENY action that denies specified operations unless explicitly overridden by a FORCE-ALLOW statement; a ALLOW-ON-CHILDREN or DENY-ON-CHILDREN that apply only when inherited (e.g., instead of saying a user has (or does not have) rights on a specific node in the graph, a resource can be configured to grant (or deny) access only for child nodes). It shall be understood the actions supported by the network-based permissioning system 104 may be extensible and are thus not limited to the above referenced examples. Further details regarding the registration process performed by the registration module 202 are discussed below in reference to FIG. 3, according to some example embodiments.

The evaluation module 204 is configured to evaluate user access permissions with respect to data resources stored in the resource database 116. The evaluation of user access permissions, in most instances, is triggered by receipt of an access request received via an API from a network application supported by the network-based permissioning system 104 (e.g., network applications 109-111). The access request includes a data resource identifier corresponding to the data resource for which access is being requested, and a user identifier corresponding to the requesting user. In some instances, the access request may further include one or more filters identifying one or more particular operations or sets of operations that are of interest.

In evaluating a user's access permission with respect to a particular data resource, the evaluation module 204 accesses a policy object associated with the data resource from the policy database 206. To evaluate requesting user's access permission for a particular data resource, the evaluation module 204 performs a depth-first evaluation and then follows a simple inheritance model. During evaluation, the evaluation module 204 tracks multiple operation sets corresponding to actions discussed above. In an example, the evaluation module 204 tracks: 1) ALLOW statements; 2) FORCE-DENY statements; and 3) FORCE-ALLOW statements.

At each node of the resource graph included in the policy object stored in the policy database 206, the evaluation module 204 evaluates the parent data resource, then performs a lazy evaluation of the dependencies (e.g. dependencies evaluated only if a condition requires the results), then evaluates the local node (e.g. the data resource for which access permission is being evaluated), and returns a merge of parent and local results.

At the top most request level, the evaluation module 204 collapses the tracked operation sets into a single set. The process for collapsing the tracked operation sets includes creating an empty set and adding all explicitly allowed operations in the empty set. The evaluation module 204 then removes all explicitly denied operations. During this operation, a special operation is used to remove all previously granted operations. The evaluation module 204 then adds all FORCE-ALLOW statements to the set.

Upon determining a user's access permissions, the evaluation module 204 communicates a response to a received access request to a requesting network application 109-111 (e.g., via appropriate API call). The response includes a set of operations the user is authorized to perform with respect to the data resource. In instances in which the access request includes operation filters, the response communicated to the requesting application 109-111 may include only those operations of interest to the application 109-111, and as such, the generation of the response may include omitting a portion of the set of all operations to users authorized to perform with respect to the data resource. Based on the response received from the evaluation module 204, the requesting application 109-111 may either enable or disable one or more operations that the user may perform with respect to the data object depending on the user's determined access permissions.

For each received access request, the evaluation module 204 creates and stores an access request log in an audit log 208. Each access request log includes a resource identifier, a user identifier, determined access permissions of the user, an identifier of the requestor (e.g., IP address), and a timestamp.

Figure 3:
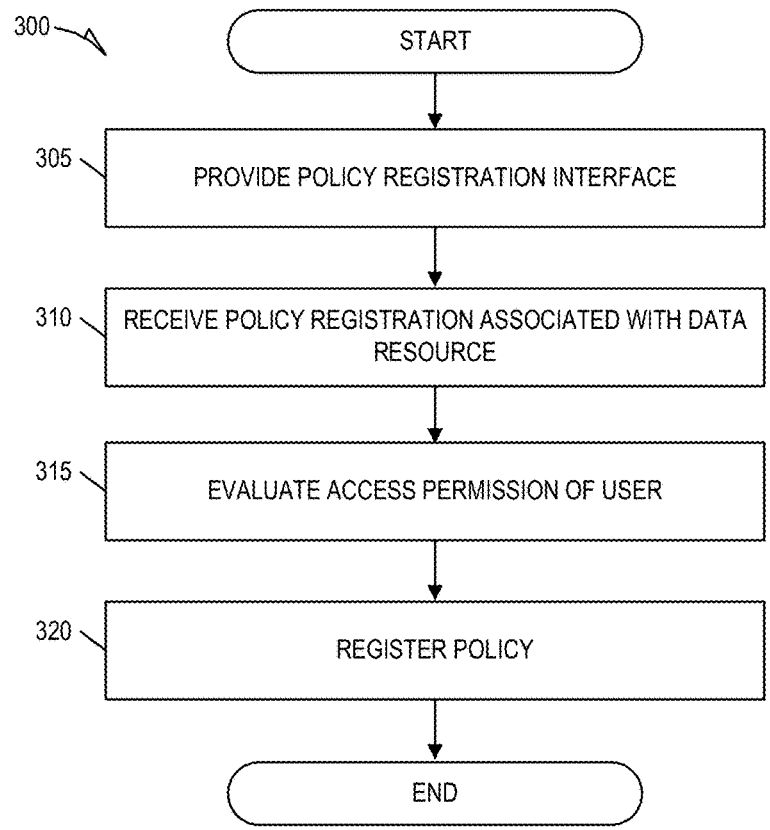
FIG. 3 is a flow-chart illustrating a method for registering a policy associated with a data resource, according to some example embodiments.

FIG. 3 is a flow-chart illustrating a method 300 for registering a policy associated with a data resource, according to some example embodiments. The method 300 is embodied in computer-readable instructions for execution by one or more processors such that the operations of the method 300 are performed in part or in whole by the network-based permissioning system 104; accordingly, the method 300 is described below by way of example with reference thereto. However, it shall be appreciated that at least some of the operations of the method 300 may be deployed on various other hardware configurations, and the method 300 is not intended to be limited to the network-based permissioning system 104.

At operation 305, the interface module 200 provides a policy registration interface to a computer device for registering a policy associated with a data resource. For example, the interface module 200 may provide a set of computer-readable instructions to the client device 118 that causes the computer device to display the policy registration interface.

Figure 4:
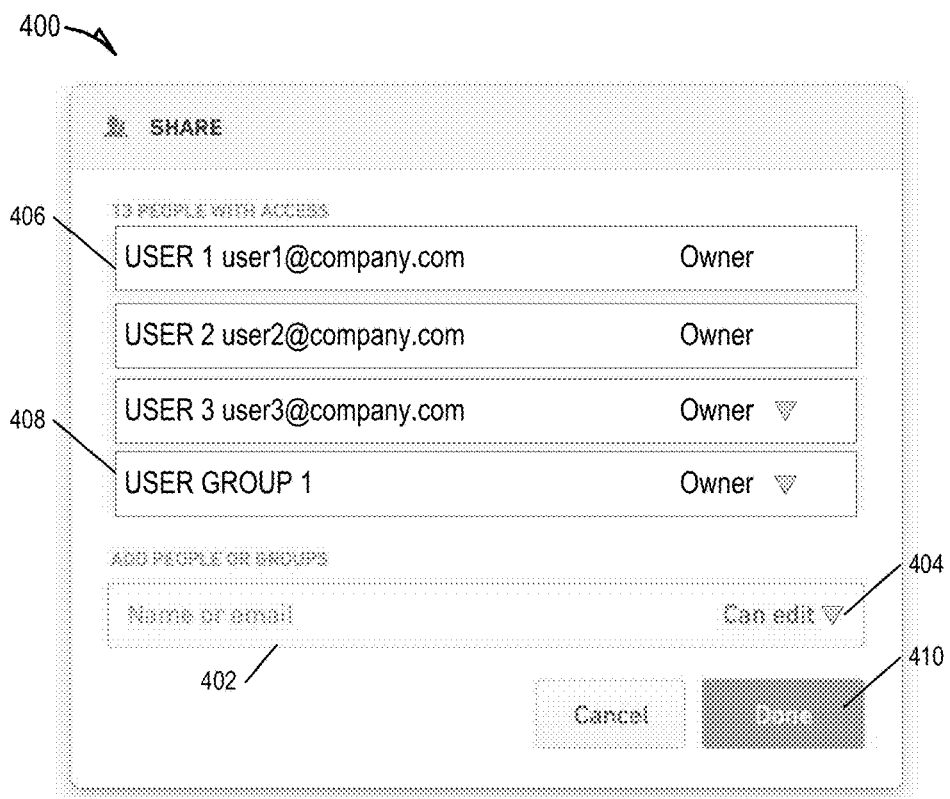
FIG. 4 is an interface diagram illustrating a portion of an interface for registering a policy associated with a data resource, according to some example embodiments.

As an example of the policy registration interface provided by the interface module 200, FIG. 4 is an interface diagram illustrating a portion of a user interface 400 for registering a policy associated with a data resource, according to some example embodiments. As shown, the user interface 400 includes a field 402 in which a registering user enters a user identifier (e.g., name, username, an email address, a phone number, or other such identifier) or user group identifier. The user interface 400 further includes a graphical element 404, specifically a drop-down menu, for specifying the access permissions of the identified user or group of user.

As shown, the user interface 400 also displays existing user access permissions included in the policy of the data resource. For example, the user interface 400 displays a user identifier 406 (the user's name) corresponding to a user who has permission to access the data resource. In particular, the user identifier 406 is listed as an "Owner" of the data resource, which indicates that the user has administrative privileges with respect to the data resource. Additionally, the user interface 400 includes a user group identifier 408 corresponding to a group of users who have access permissions with respect to the data resource. In particular, the group of users identified by the user group identifier 408 are authorized to edit the data resource.

The button 410 is used by the registering user to submit the policy to the registration module 202. More specifically, upon user selection of the button 410, the interface module 200 provides the registration module 202 with a policy registration for the data resource. Returning to FIG. 3, at operation 310, the evaluation module 204 receives the policy registration associated with the data resource. The policy registration includes a user identifier and the specified access permissions of the user with respect to the data resource.

At operation 315, the evaluation module 204 evaluates the access permissions of the registering user. In particular, the evaluation module 204 determines whether the registering user is authorized to edit the policy associated with the data resource. Further details of the process of evaluating user access permissions are discussed below in reference to FIG. 7, according to some example embodiments.

At operation 320, the registration module 202 registers the policy associated with the data resource based on the access permissions of the registering user authorizing the registering user to modify the policy of the data resource. In instances in which the data resource does not have an existing policy, the registering of the policy includes creating and storing a policy object associated with the data resource in the policy database 206. In instances in which the data resource has an existing policy, the registering of the policy includes updating a policy object associated with the data resource that is stored in the policy database 206. The stored or updated policy object includes the statements included in the policy specified by the registering user via the policy registration interface.

Figure 5:
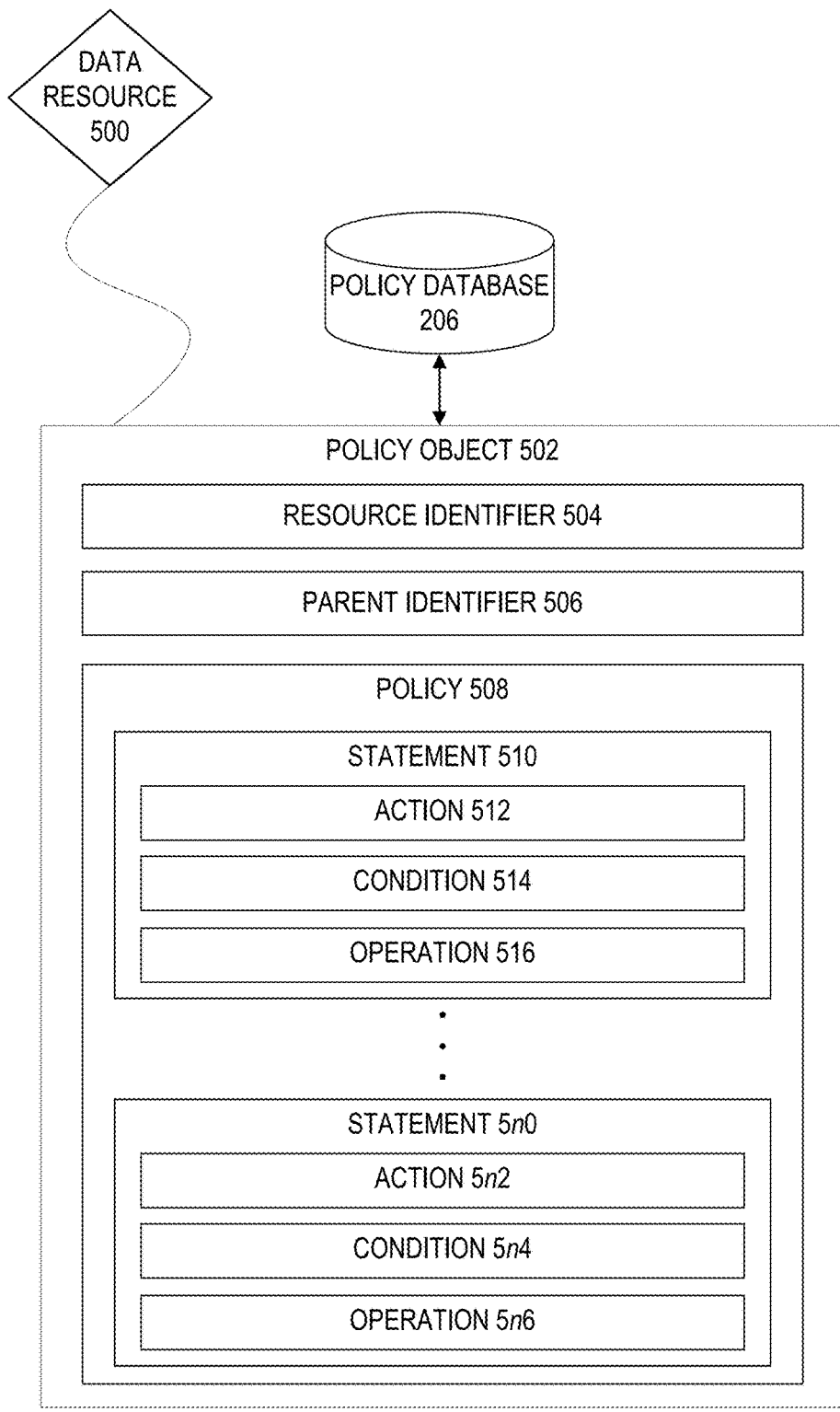
FIG. 5 is a data structure diagram illustrating elements of a policy object maintained in a database of the network-based permissioning system, according to some example embodiments.

As an example, FIG. 5 is a data structure diagram illustrating elements of a policy object 502 associated with a data resource 500, according to some example embodiments. The data resource 500 is stored in the resource database 116 while the policy object 502 is stored in the policy database 206. The policy object 502 includes a resource identifier 504 that identifies the data resource 500. The policy object 502 further includes a parent identifier 506 field that includes an identifier of parent data resources from which the data resource 500 depends. In instances in which the data resource 500 does not have any dependencies, the parent identifier 506 includes a null entry.

The policy object 502 further includes a policy 508 that comprises a set of unordered statements 510-5n0. By maintaining the parent identifier 506 in the policy object 502 associated with the data resource 500, the network-based permissioning system 104 is able to track the inheritance chain of the data resource 500. The inheritance chain of the data resource 500 include a parent data resource (other data resources from which the data resource 500 depends) along with child data resources (other data resources that depend on the data resource 500). Accordingly, the statements 510-5n0 include statements explicitly associated with the data resource 500. Statements that are implicitly associated with the data resource 500 through inheritance from the dependency of data resource 500 on the parent resource identified in the parent identifier 506 field may be evaluated by accessing the policy object associated with the parent resource. The statement 510 includes action 512, condition 514, and operation 516. The action 512 defines the behavior associated with the statement 510. The condition 514 is used to determine application of the action 512 to the operation 516. The operation 516 is the operation affected by the statement 510. The action 510 may specify that the user is either allowed or denied to perform operation 516 based on whether the condition 514 is satisfied. The network-based permissioning system 104 may further support actions that override other specified operations.

In instances in which a data resource 500 for which a policy registration has been submitted includes a dependency on another data resource, the evaluation module 204 updates a hierarchical representation of the access permissions of the data resource 500 in accordance with the received policy during the registration of the policy, which may include applying the registered policy to other data resources in the inheritance chain of the data resource 500. Accordingly, the registering of the policy may include modifying policy objects associated with data resources (e.g., parent and child data resources) in the inheritance chain to include at least a portion of the plurality of permission statements from the newly registered policy.

Figure 6:
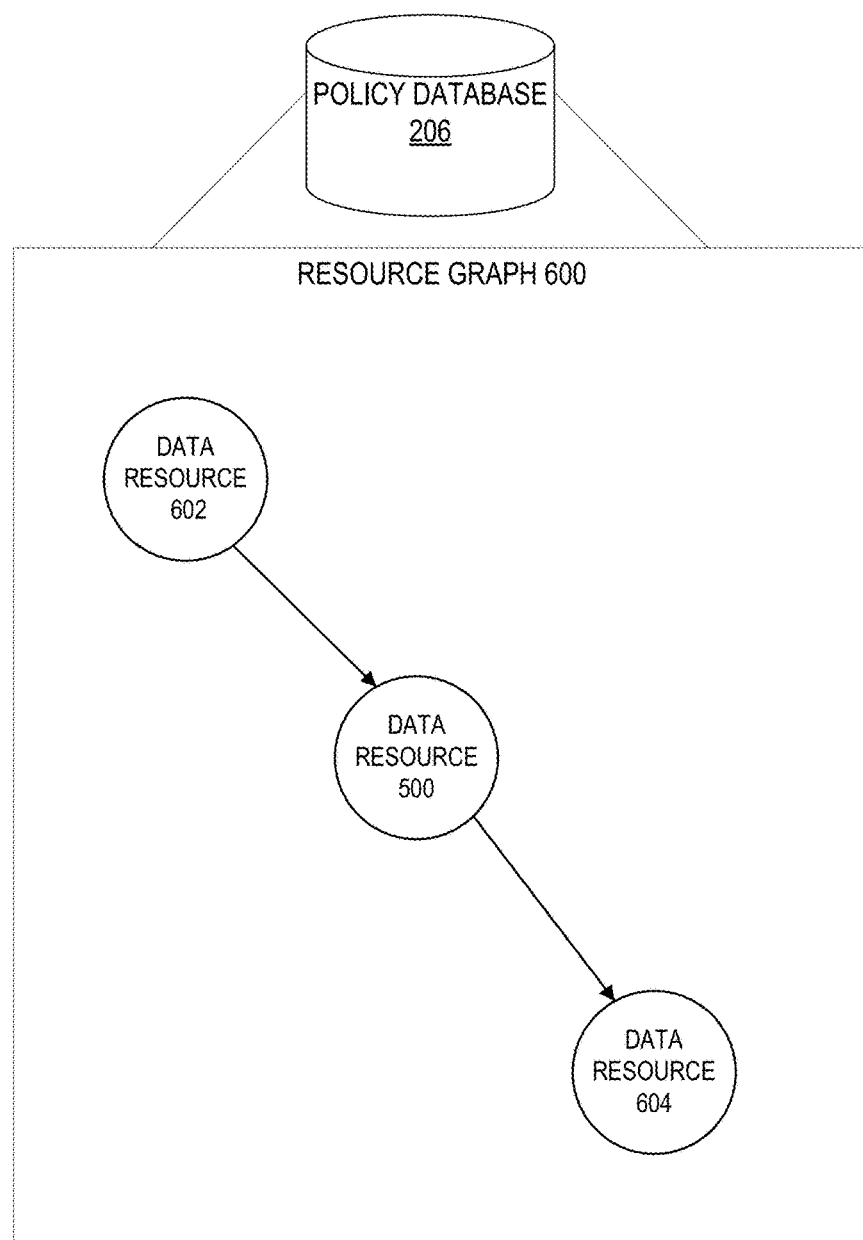
FIG. 6 is a data structure diagram illustrating a resource graph maintained in a database of the network-based permissioning system, according to some embodiments.

As an example, FIG. 6 is a data structure diagram illustrating a resource graph 600 maintained in the policy database 206 of the network-based permissioning system 104, according to some embodiments. The resource graph 600 may be maintained for each of the data resources stored in the data resource database 116. Each resource graph may be maintained independently from policy objects or as part of policy objects. For example, the resource graph 600 may be stored as part of the policy object 502.

The individual nodes in the resource graph 600 represent data resources, though the nodes do not themselves include the contents of the data resources that they represent. For example, the resource graph 600 is stored in the policy database 206 of the network-based permissioning system 104 while each of the data resources 500, 602, and 604 are stored separately in the resource database 116.

As shown, the resource graph 600 includes a representation of an inheritance chain of the data resource 500. In particular, the resource graph 600 includes a representation of a dependency of the data resource 500 on parent data resources 602. Further, the resource graph 600 includes a representation of a child resource—data resource 604—that is dependent on the data resource 500. In registering a new policy associated with data resource 500, the registration module 202 may update an effective policy associated with data resource 604 to include at least a portion of the statements 510-5$n$0 included in the policy associated with data resource 500. By maintaining an effective policy associated data resource, the network-based permissioning system 104 tracks inherited access permissions of dependent data resources. Thus, by maintaining a representation of an effective policy of the inheritance chain of the data resource 500, the network-based permissioning system 104 maintains all policy information with respect to a particular data resource in a policy object associated with the data resource such that the evaluation module 204 of the network-based permissioning system 104 needs only to read a single node in order to compute the access permissions of the whole resource graph 600.

Figure 7:
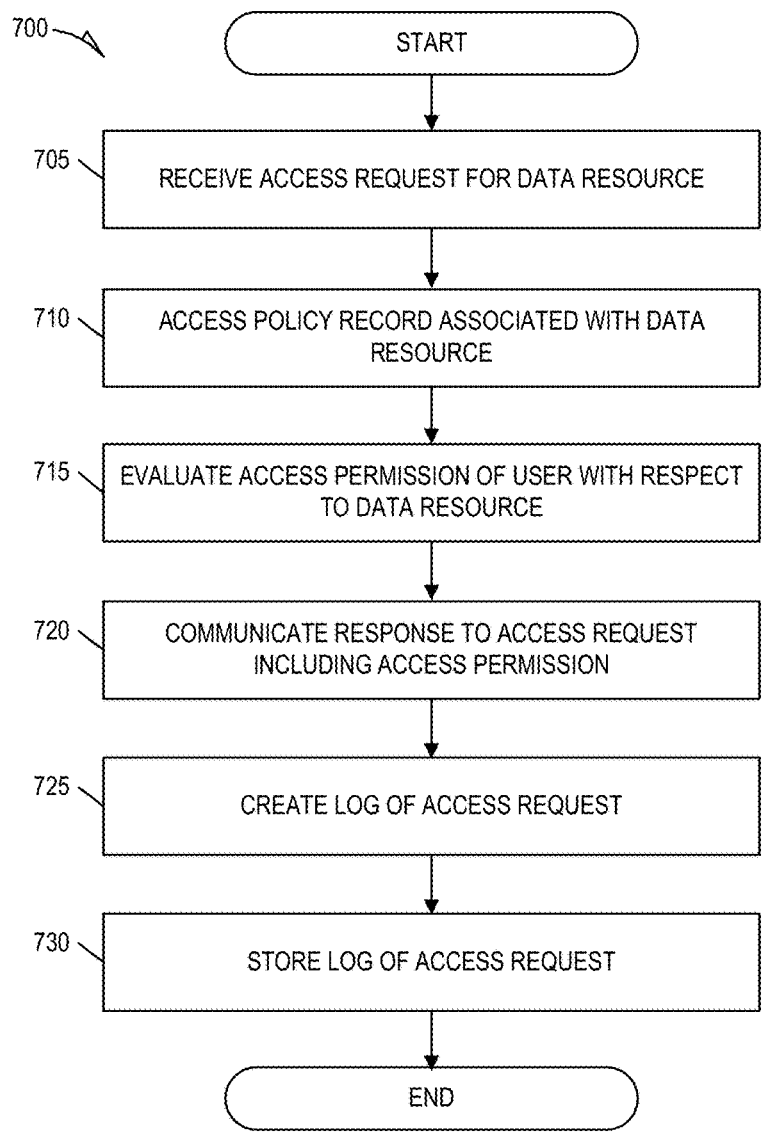
FIG. 7 is a flowchart illustrating a method for processing access permissions associated with a data resource, according to some embodiments.

FIG. 7 is a flowchart illustrating a method 700 for processing access permissions associated with a data resource, according to some embodiments. The method 700 is embodied in computer-readable instructions for execution by one or more processors such that the operations of the method 700 are performed in part or in whole by the network-based permissioning system 104; accordingly, the method 700 is described below by way of example with reference thereto. However, it shall be appreciated that at least some of the operations of the method 700 may be deployed on various other hardware configurations, and the method 700 is not intended to be limited to the network-based permissioning system 104.

At operation 705, the interface module 200 receives an access request for a data resource. For example, the interface module 200 may receive an access request from one of the network applications 109-111 via an API call to access the data resource 500. The access request includes a resource identifier (e.g., resource identifier 504) corresponding to the data resource (e.g., data resource 500) and a user identifier corresponding to the requesting user. The user identifier may, for example, be or include a name, a username, an e-mail address, an employee number, or any other unique identifier suitable for identifying the user. Consistent with some embodiments, as part of the receiving of the access request, the interface module 200 receives a bearer token, which is a cryptographically secure string that represents a user. The network-based permissioning system 104 may interact with various user network services (e.g., via data exchanges over the network 112) that check the validity of the token, and return a user object that includes the user identifier.

At operation 710, the evaluation module 204 accesses a policy object (e.g., policy object 502) associated with the data resource from the policy database 206 in response to receiving the access request for the data resource. For example, upon receiving an access request for the data resource 500, the evaluation module 204 accesses the policy object 502 from the policy database 206. As discussed above, the policy object includes a list of unordered statements that define the requesting user's access permissions with respect to the policy object. The policy object may include statements explicitly registered in association with the data resource as well as statements inherited by the data resource based on a dependency to other data resources.

At operation 715, the evaluation module 204 evaluates the access permissions of the identified user with respect to the identified data resource based on the information included in the policy object. The access permission of the user with respect to the data resource refers to a set of operations the user is authorized to perform on the data resource. Accordingly, the evaluation of the access permission of the user includes determining a set of operations the user is authorized to perform with respect to the data resource, which depends on whether conditions included in the set of statements included in the policy are satisfied. Hence, the evaluation of the access permission of the user may include determining whether conditions included in set of statements are satisfied. As an example, a statement in the policy may include a condition that specifies a particular user identifier corresponding to an allowed user, and the determination that the condition is satisfied is based on the user identifier of the requesting user matching the user identifier of the allowed user. As another example, a statement in the policy may include a temporal condition that specifies as a time range in which a requesting user may access the data resource, and the determination that the condition is satisfied is based on whether the access request is received within the time range.

In evaluating a user's access permission with respect to a particular data resource, the evaluation module 204 accesses a policy object associated with the data resource from the policy database 206. To evaluate the requesting user's access permission for a particular data resource, the evaluation module 204 performs a depth-first evaluation and then follows a simple inheritance model. At each node of the resource graph included in the policy object stored in the policy database 206, the evaluation module 204 first evaluates the parent data resource, then, performs at lazy evaluation of the dependencies (e.g. dependencies evaluated only if a condition requires the results), then evaluates the local node (e.g. the data resource for which access permission is being evaluated), and returns a merge of parent and local results. At the top most request level, the evaluation module 204 collapses the tracked operation sets into a single set. The process for collapsing the tracked operation sets includes creates an empty set adding all explicitly allowed operations in the empty set. The evaluation module 204 then removes all explicitly denied operations. During this operation, a special operation is used to remove all previously granted operations. The evaluation module 204 then adds all override allow statements (e.g., FORCE-ALLOW statements) to the set.

At operation 720, the evaluation module 204 works in conjunction with the interface module 200 to communicate a response to the access request to the requesting application (e.g., via API call). The response to the access request includes the access permission of the user and accordingly, the response includes a set of operation the user is authorized to perform with respect to the application. Based on the access permissions included in the response, the requesting application may either grant or deny the user's access to the data resource, which may include either enabling or disabling certain operations or functionalities of the requesting application.

At operation 725, the evaluation module 204 creates a log of the access request. The log of the access request includes an indication of receipt of the access request, a time corresponding to receipt of the access request, an identifier of the user, and the determined access permission of the user. At operation 730, the evaluation module 204 stores the log in the audit log 208.

Figure 8:
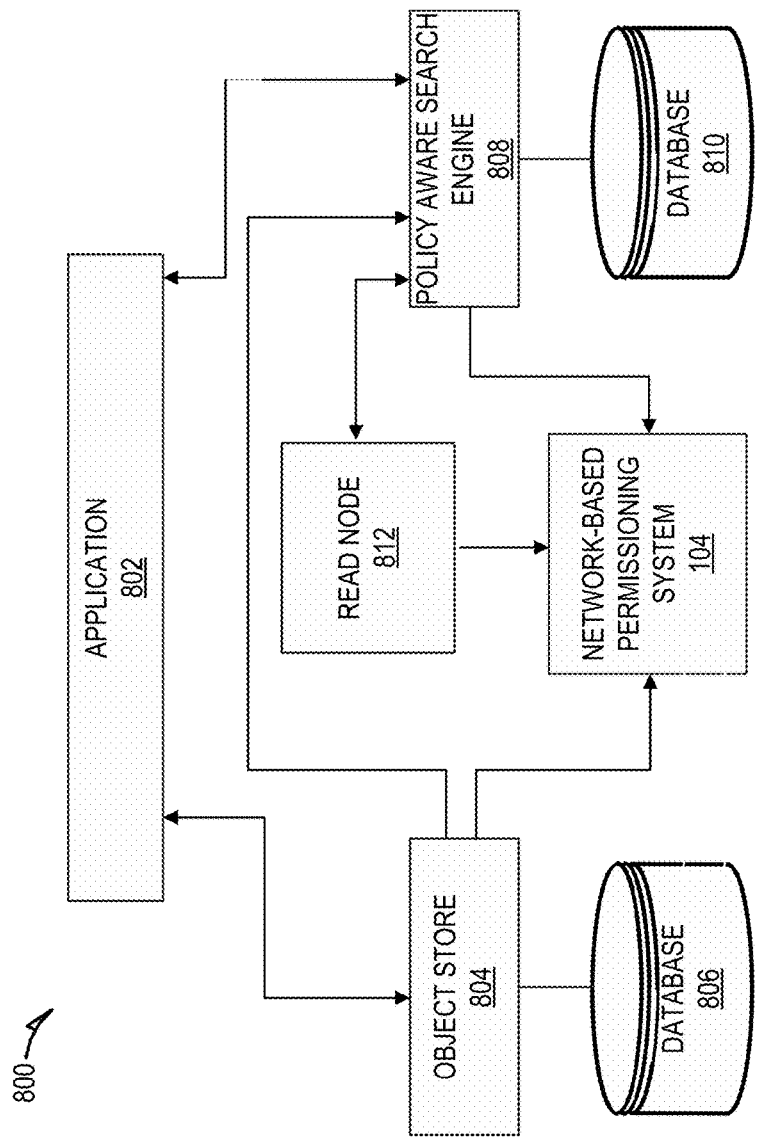
FIG. 8 is a block diagram illustrating an example network environment in which the network-based permissioning system may operate, according to some embodiments.

FIG. 8 is a block diagram illustrating an example network environment 800 in which the network-based permissioning system 104 may operate, according to some embodiments. As shown, the network environment 800 includes: an application 802; an object store 804 connected to a database 806; a policy aware search engine 808 connected to a database 810; and the network-based permissioning system 104. Each of the above referenced functional components of the network environment may be implemented using hardware (e.g., a processor of a machine) or a combination of logic (e.g., executable software instructions) and hardware (e.g., memory and processor of a machine) for executing the logic. Furthermore, each of the various functional components may reside on a single computer (e.g., a server), or may be distributed across several computers in various arrangements such as cloud-based architectures.

The application 802 is a web-based application in communication with either or both of the object store 804 and the policy aware search engine 808. For example, the application 802, which may correspond to any one of the network applications 109-111, may be used to analyze data to develop various insights about the data, and visualize various metrics associated with the data.

The object store 804 is built on top of database 806. Consistent with some embodiments, the object store 804 may be secure, bucketed, and/or store key/value pairs. Data may be secured using authentication tokens and access permissions may be checked using the network-based permissioning system 104. The object store 804 may be bucketed by organizing a range of keys and associated values in a namespace. In one embodiment, the keys may be strings.

Users of the object store 804 may input a version tag on operations to force single key atomic updates. In one embodiment, version tags may enable counters, and a counter may be incremented if there is a previous increment. In another embodiment, if object store 804 receives a version tag for an operation, the operations may not be idempotent (e.g., a second call of the operation may cause an error if the first call of the operation succeeds). In a further embodiment, if object store 804 does not receive a version tag for an operation, the data store 804 may make the assertion that the operation will be idempotent (e.g., the resulting state and call behavior will be the same, or its side effects are guaranteed to be applied).

When data store 804 stores an object, the object may also be added in a table in the database 806, and the object may be pushed to a notification channel (e.g., via a callback API defined by the data store 804). The policy aware search engine 808 may receive the notification(s) (e.g., via an event listener API). In one embodiment, events may be pushed to a single URL per configured receiver.

The object store 804 may have an endpoint that users can use to POST multi-part forms of objects to insert. In one embodiment, the endpoint may atomically insert the object. In another embodiment, the endpoint may determine the relevant bucket(s), key(s) and/or version(s) from headers set in the form body.

The data store 804 may index written data into policy aware search engine 808. In some embodiments, the policy aware search engine 808 may enable faster searching than the object store 804. In some embodiments, the policy aware search engine 808 may be an Elasticsearch backed search service. In some embodiments, the policy aware search engine 808 may have schemas and object level access control lists (e.g., based on the network-based permissioning system 104). The policy aware search engine 808 may back the application 802 and/or index arbitrary objects from the object store 804. The policy aware search engine 808 may expose a search query API. For example, the policy aware search engine 808 may expose an Elasticsearch query API, thereby adding a security layer on top of the search service (e.g., Elasticsearch) as well as an indexing API for other services to index arbitrary objects.

The policy aware search engine 808 may also index resource identifiers accessible to a user into read node 812. In some embodiments, the read node 812 may enable faster searching than the policy aware search engine 808 without read node 812. Read node 812 may subscribe to the event log of network-based permissioning system 104 (e.g., audit log 208). For every access request to network-based permissioning system 104, read node 812 may also store a user identifier and a resource identifier. Upon receiving a search query from a user, the policy aware search engine 808 may query read node 812 with a user identifier corresponding to the requesting user. Read node 812 responds to policy aware search engine 808 with a list of all resource identifiers accessible to the user identifier, which represent only a subset of the records in the database 810. Policy aware search engine 808 may query database 810 to run the search query on only the subset of records containing the resource identifiers returned by read node 812. In this manner, the policy aware search engine 808 may avoid running the search query against ever record in the database 810 and verifying each queried result from database 810 with network-based permissioning system 104 to confirm the user can access the queried result. The read node 812 may further provide users with an option to use post-filtering for certain sensitive uses cases.

In some embodiments, for every access request to network-based permissioning system 104, read node 812 may further store version information, (e.g., a time corresponding to receipt of the access request, version tag, or version number). In some embodiments, the user may tolerate a specified latency or difference in values between the version information stored in read node 812 and the version information stored in network-based permissioning system 104. In some embodiments, read node 812, application 802, and/or policy aware search engine 808 may accept a threshold input by a user as the specified latency or difference in values between the version information stored in read node 812 and network-based permissioning system 104. If the specified latency or difference in values between the version information stored in read node 812 and the version information stored in network-based permissioning system 104 exceed the inputted threshold, policy aware search engine 808 may query database 810 without limiting the search query to the resource identifiers returned by read node 812.

Figure 9:
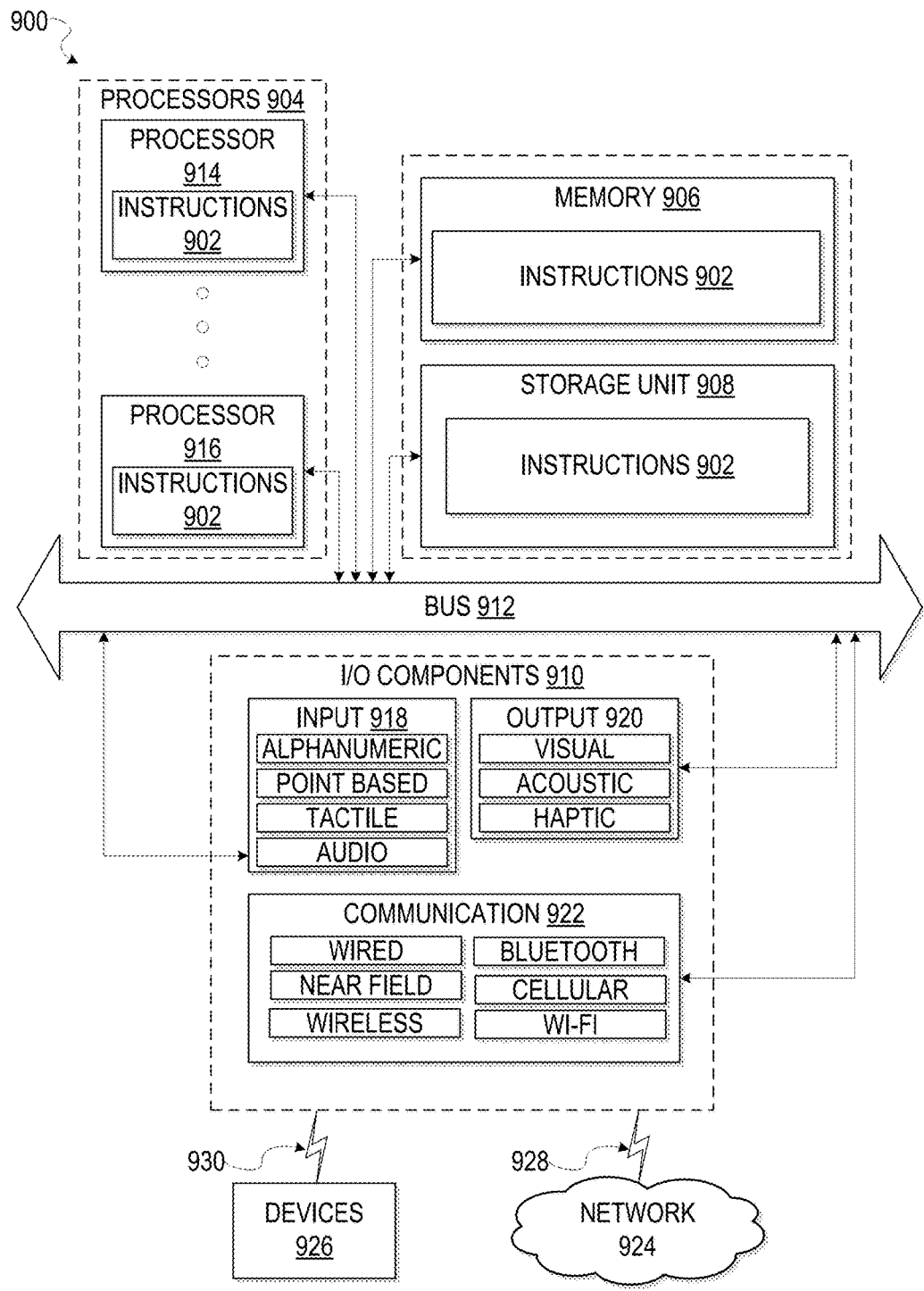
FIG. 9 is a diagrammatic representation of a machine in the example form of a computer system within which a set of instructions for causing the machine to perform any one or more of the methodologies discussed herein may be executed.

FIG. 9 is a diagrammatic representation of a machine in the example form of a computer system within which a set of instructions for causing the machine to perform any one or more of the methodologies discussed herein may be executed. Specifically, FIG. 9 shows a diagrammatic representation of the machine 900 in the example form of a system, within which instructions 902 (e.g., software, a program, an application, an applet, an app, a driver, or other executable code) for causing the machine 900 to perform any one or more of the methodologies discussed herein may be executed. For example, the instructions 902 include executable code that causes the machine 900 to execute the methods 300 and 700. In this way, these instructions 902 transform the general, non-programmed machine into a particular machine programmed to carry out the described and illustrated functions in the manner described herein. The machine 900 may operate as a standalone device or may be coupled (e.g., networked) to other machines.

By way of non-limiting example, the machine 900 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 902, sequentially or otherwise, that specify actions to be taken by machine 900. Further, while only a single machine 900 is illustrated, the term "machine" shall also be taken to include a collection of machines 900 that individually or jointly execute the instructions 902 to perform any one or more of the methodologies discussed herein.

The machine 900 may include processors 904, memory 906, storage unit 908 and I/O components 910, which may be configured to communicate with each other such as via a bus 912. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 914 and processor 916 that may execute instructions 902. The term "processor" is intended to include multi-core processors that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory 906 (e.g., a main memory or other memory storage) and the storage unit 908 are both accessible to the processors 904 such as via the bus 912. The memory 906 and the storage unit 908 store the instructions 902 embodying any one or more of the methodologies or functions described herein. In some embodiments, the resource database 112 resides on the storage unit 908. The instructions 902 may also reside, completely or partially, within the memory 906, within the storage unit 908, within at least one of the processors 904 (e.g., within the processor's cache memory), or any suitable combination thereof, during execution thereof by the machine 900. Accordingly, the memory 906, the storage unit 908, and the memory of processors 904 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 902. The term "machine-readable medium" shall also be taken to include any medium, or combination of multiple media, that is capable of storing instructions (e.g., instructions 902) for execution by a machine (e.g., machine 900), such that the instructions, when executed by one or more processors of the machine 900 (e.g., processors 904), cause the machine 900 to perform any one or more of the methodologies described herein (e.g., methods 300 and 700). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 910 may include a wide variety of components to receive input, provide output, produce output, transmit information, exchange information, capture measurements, and so on. The specific I/O components 910 that are included in a particular machine will depend on the type of machine. For example, portable machines such as mobile phones will likely include a touch input device or other such input mechanisms, while a headless server machine will likely not include such a touch input device. It will be appreciated that the I/O components 910 may include many other components that are not specifically shown in FIG. 9. The I/O components 910 are grouped according to functionality merely for simplifying the following discussion and the grouping is in no way limiting. In various example embodiments, the I/O components 910 may include input components 918 and output components 920. The input components 918 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 910 may include communication components 922 operable to couple the machine 900 to a network 924 or devices 926 via coupling 928 and coupling 930, respectively. For example, the communication components 922 may include a network interface component or other suitable device to interface with the network 924. In further examples, communication components 922 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 926 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:
    receiving, from a network application, an access request for a data resource stored in a first network database, the access request including a resource identifier and a user identifier, the resource identifier identifying the data resource, the user identifier identifying a user of the network application;
    in response to receiving the access request, using the resource identifier included in the access request to access, from a second network database, a policy object linked to the data resource, the policy object including an effective policy for the data resource, the effective policy including access permissions of the data resource, at least one of the access permissions included in the effective policy of the data resource being inherited from at least one parent data resource from which the data resource depends, the at least one of the access permissions including a statement, the statement including an operation performable with respect to the data resource based on satisfaction of one or more conditions;
    evaluating, using a hardware processor, the at least one of the access permissions of the data resource with respect to the user based at least in part on whether the one or more conditions included in the at least one of the access polices are satisfied; and
    communicating, to the network application, a response to the access request, the response to the access request including the a result of the evaluating of the at least one of the access permissions of the data resource with respect to the user.

2. The method of claim 1, further comprising:
    providing, to a client device, a user interface for registering a policy, the user interface including one or more input fields to receive a policy registration;
    receiving, from the client device, a policy registration associated with an additional data resource stored in the first network database, the policy registration including an additional resource identifier and a plurality of statements, the additional resource identifier identifying the additional data resource, each of the plurality of statements including a condition and an operation; and registering a policy associated with the additional data resource based on the policy registration.

3. The method of claim 2, wherein the registering of the policy includes creating and storing, in the second network database, an additional policy object associated with the additional data resource.

4. The method of claim 3, wherein:

the data resource depends on the additional data resource; and the additional policy object includes a data structure comprising a hierarchical resource graph that represents a dependency of the data resource on the additional data resource.

5. The method of claim 4, wherein the registering of the policy includes applying the policy to the data resource by modifying the effective policy associated with the data resource to include at least a portion of the plurality of statements included in the policy associated with the additional data resource.

6. The method of claim 1, wherein the access request is received from a network application included in a suite of network applications, the suite of network applications sharing access to the first network database.

7. The method of claim 6, wherein the policy object includes a plurality of statements including the statement, at least one statement of the plurality of statements defining a condition for permitting or denying the user to perform an application specific operation associated with a particular network application from among the suite of network applications.

8. The method of claim 7, wherein the plurality of statements includes at least one selected from the group comprising:

a first statement granting the user permission to perform a first operation based on satisfaction of a first condition;

a second statement denying the user permission to perform a second operation based on satisfaction of a second condition;

a third statement overriding access permission granted by a fourth statement; or a fifth statement overriding access permission denied by a sixth statement.

9. The method of claim 1, further comprising:

creating a log of the access request, the log including an identifier of the network application, the user identifier, the access permission of the user, and a timestamp; and storing the log of the access request in a third network database.

10. The method of claim 1, wherein:

the one or more conditions include an allowed user identifier, and the satisfaction of the one or more conditions is based on the user identifier matching the allowed user identifier.

11. The method of claim 1, wherein:

the one or more conditions include a temporal condition specifying a time range, and the satisfaction of the one or more conditions is based on the access request being received within the time range.

12. The method of claim 1, wherein the access permission includes an operation the user is authorized to perform on the data resource using the network application.

13. A system comprising:

one or more processors of a machine;

a first non-transitory machine-readable medium storing a plurality of policy objects associated with a plurality of data resources, the plurality of data resources stored in a network database accessed by one or more network applications hosted by one or more servers; and a second non-transitory machine-readable medium storing instructions that, when executed by the one or more processors of the machine, cause the machine to perform operations comprising:

receiving, from a network application from among the plurality of network applications, an access request for a data resource from among the plurality of data resources stored in the network database, the access request including a resource identifier and a user identifier, the resource identifier identifying the data resource, the user identifier identifying a user of the network application;

in response to receiving the access request, using the resource identifier included in the access request to access, from the first non-transitory machine-readable medium, a policy object linked to the data resource, the policy object including an effective policy for the data resource, the effective policy including access permissions of the data resource, at least one of the access permission included in the effective policy of the data resource being inherited from at least one parent data resource from which the data resource depends, the at least one of the access permissions including a statement, the statement including an operation performable with respect to the data resource based on satisfaction of one or more conditions;

evaluating the at least one of the access permissions of the data resource with respect to the user based at least in part on whether the one or more conditions included in the at least one of the access policies are satisfied; and communicating, to the network application, a response to the access request, the response to the access request including a result of the evaluation of the at least one of the access permissions of the data resource with respect to the user.

14. The system of claim 13, wherein the operations further comprise:

providing, to a client device, a user interface for registering a policy, the user interface including one or more input fields to receive a policy registration;

receiving, from the client device, a policy registration associated with the data resource, the policy registration including the resource identifier and a plurality of additional statements; and registering a policy associated with the data resource based on the policy registration.

15. The system of claim 14, wherein the registering of the policy includes updating the policy object associated with the data resource to include the plurality of additional statements.

16. The system of claim 14, wherein:

a child resource depends on the data resource, and the registering of the policy includes updating an effective policy associated with the child resource, the effective policy being updated to include at least a portion of the plurality of additional statements.

17. The system of claim 13, wherein the policy object includes a data structure comprising a hierarchical resource graph that represents a dependency of the data resource on the at least one parent data resource.

18. The system of claim 13, wherein the operations further comprise:

creating a log of the access request, the log including an identifier of the network application, the user identifier, the access permission of the user, and a timestamp; and storing the log of the access request in a third network database.

19. The system of claim 13, wherein:

the one or more conditions include an allowed user identifier, and the satisfaction of the one or more conditions is based on the user identifier matching the allowed user identifier.

20. A non-transitory machine-readable storage medium embodying instructions that, when executed by at least one processor of a machine, cause the machine to perform operations comprising:

receiving, from a network application hosted by a server, an access request for a data resource stored in a first network database, the access request including a resource identifier and a user identifier, the resource identifier identifying the data resource, the user identifier identifying a user of the network application;

in response to receiving the access request, using the resource identifier included in the access request to access, from a second network database, a policy object linked to the data resource, the policy object including an effective policy for the data resource, the effective policy including access policies of the data resource, at least one of the access permissions included in the effective policy of the data resource being inherited from at least one parent data resource from which the data resource depends, the at least one of the access permissions including a statement, the statement including an operation performable with respect to the data resource based on satisfaction of one or more conditions;

evaluating the at least one of the access permissions of the data resource with respect to the user based on whether the one or more conditions included in the at least one of the access policies are satisfied; and communicating, to the network application, a response to the access request, the response to the access request including a result of the evaluating of the at least one of the access permissions the data resource with respect to the user.

* * * * *